United States Patent [19]

Tsay

[11] Patent Number: 5,191,832
[45] Date of Patent: Mar. 9, 1993

[54] TUBULAR STUFFING APPARATUS

[76] Inventor: Shih C. Tsay, No. 62, Line 313, Wen Hsien Rd., Tainan, Taiwan

[21] Appl. No.: 755,051

[22] Filed: Sep. 5, 1991

[51] Int. Cl.$^5$ .............................................. A21C 9/06
[52] U.S. Cl. .................................... 99/450.6; 99/450.7
[58] Field of Search ........................ 99/450.7, 450.6; 425/334

[56] References Cited

U.S. PATENT DOCUMENTS 4,636,158  1/1987  Huang ............................. 425/133.1
4,899,650  2/1990  Larsen ............................... 99/450.7

FOREIGN PATENT DOCUMENTS 1296096  3/1987  U.S.S.R. ............................... 425/334

Primary Examiner—Bernard Nozick
Attorney, Agent, or Firm—Jacobson, Price, Holman & Stern

[57] ABSTRACT

A tubular stuffing apparatus for making stuffed dough tubes to be cut into separate dough buns, comprising a conveying belt for a band dough sheet to lie on and be moved forward, a roller to pick and roll up the band dough sheet, and a stuff transporting tube to transport stuff which is to be pushed out of an end opening of the tube to be wrapped in a dough tube formed from the band dough sheet at first rolled up by the roller and then wound around the tube.

2 Claims, 5 Drawing Sheets

TUBULAR STUFFING APPARATUS

BACKGROUND OF THE INVENTION

Traditional Chinese food and snack such as meat stuffed buns, dumplings have generally been made manually, but recently bun making apparatus have been devised, for example, a U. S. Patent No. 4,636,158, "Apparatus for making buns". But this apparatus is rather complicated and its making speed is not so fast, as its making theory is based on a manual process.

SUMMARY OF THE INVENTION

This invention, a tubular stuffing apparatus, has been devised to make a dough tube stuffed with meat, vegetable or mixed ingredients and then cut into a plurality of separate dough pieces wrapping stuff and formed into dough buns for baking or steaming.

The tubular stuffing apparatus in the present invention comprises a conveying belt for a band dough sheet to lie on and to be moved on forward, a roller positioned a little above the surface of the conveying belt and rotating to pick and roll up the band dough sheet, and a stuff transporting tube for transporting stuff to be pushed through an end opening and then to be wrapped in a dough tube, which is to be formed from the band dough sheet being wound on this tube rotating in the opposite direction to that of the roller after the band dough sheet is rolled up by the roller.

DETAILED DESCRIPTION OF THE INVENTION

Figure 1:
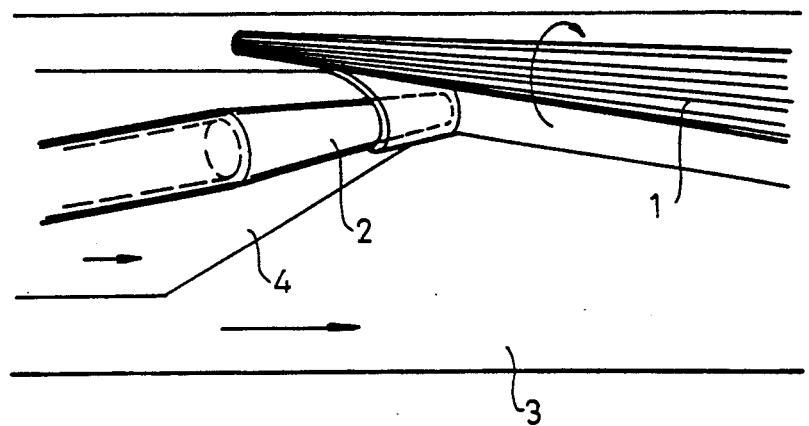
FIG. 1 is a perspective view of the first embodiment of a tubular stuffing apparatus in the present invention.

The first embodiment of a tubular stuffing apparatus, as shown in FIG. 1, comprises a roller 1, a stuff transporting tube 2, and a conveying belt 3 as the main components. As for a power source for moving the roller 1, the tube 2 and the conveying belt 3 and the method of supporting the roller 1, etc., they are not described here, being a well-known art.

The roller 1 is shaped conic, having a plurality of longitudinal straight embossed lines, provided to be located only a little above the surface of the conveying belt 3 and being rotated by a power source, having its end inclinedly pointing against the moving direction of the belt so that a band dough sheet 4 laid on the belt 3 can have one of its corner touch with the roller 1, which picks and rolls up the corner of the beginning of the dough sheet 4, making the dough sheet to be wound around the stuff transporting tube 2.

Figure 4:
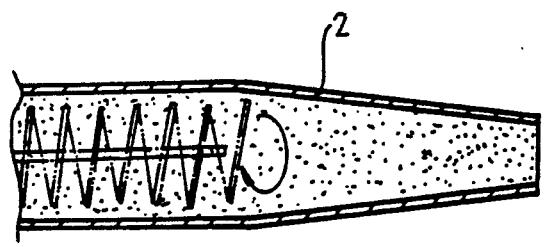
FIG. 4 is a magnified cross-sectional view of the part marked 4 in FIG. 4.

The stuff transporting tube 2 is made of metal, provided with a conveying screw therein to push forward stuff contained in the tube 2 to be moved out of an end opening, as shown in FIG. 4. The end opening of the stuff transporting tube 2 is positioned at the point where the roller 1 and the dough sheet begins to meet each other.

The conveying belt 3 is made of leather or the like, positioned to move toward the roller 1 so that one corner of the begining of a band dough sheet laid on it can go to touch the roller 1 which then picks and rolls it up.

Figure 2:
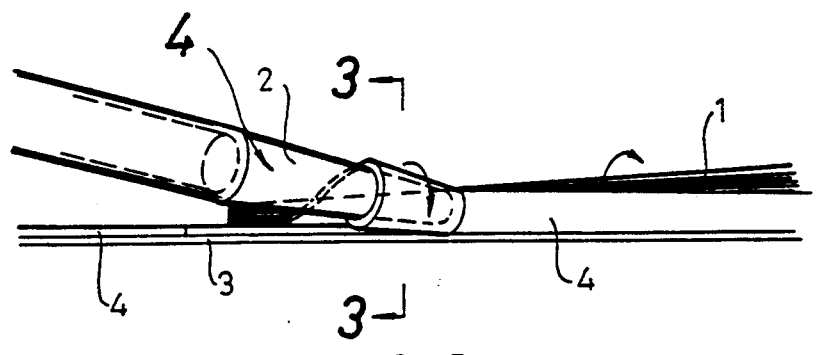
FIG. 2 is an elevational view of the first embodiment of a tubular stuffing apparatus in the present invention.
Figure 3:
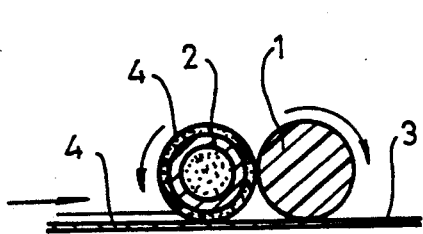
FIG. 3 is a cross-sectional view of line 3—3 in FIG. 2.

As the band dough sheet laid on the conveying belt 3 is moved forward, as shown in FIGS. 2 and 3, with one corner of the beginning to touch the roller 1, which can then pick and roll it up, and then to be wound around the stuff transporting tube 3, gradually becoming a dough tube. At the same time, the stuff transported in the tube 3 also can be pushed out of the end opening to fall inside of the dough tube formed by the tube 3. So the dough sheet 4 is continually formed into a dough tube filled with the stuff coming out of the end opening of the tube 3.

Figure 5:
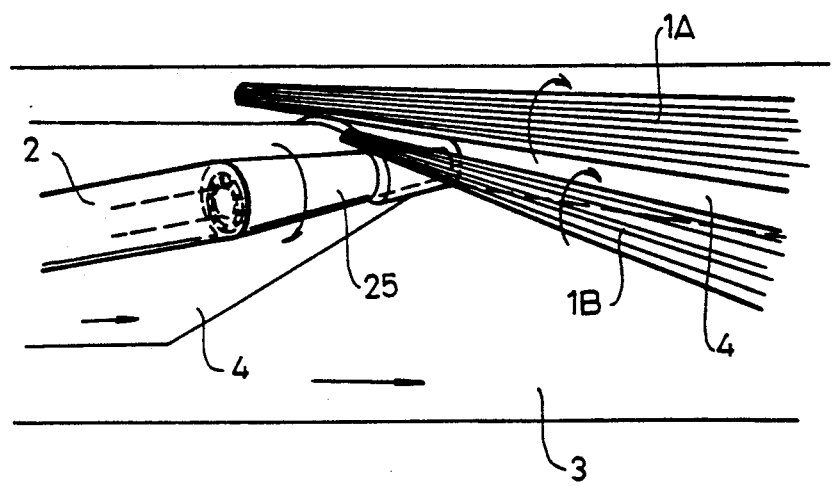
FIG. 5 is an upper view of the second embodiment of a tubular stuffing apparatus in the present invention.
Figure 6:
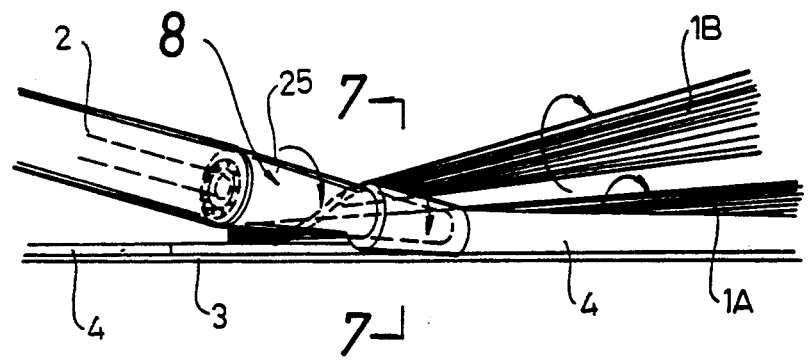
FIG. 6 is an elevational view of the second embodiment of a tubular stuffing apparatus in the present invention.

FIG. 5 shows the second embodiment of a tubular stuffing apparatus in the present invention, wherein there are two rollers 1A, and 1B, one long and one short, instead of the roller 1 in the first embodiment, a tubular stuff transporting tube 2, and a conveying belt 3 as the main components.

Figure 7:
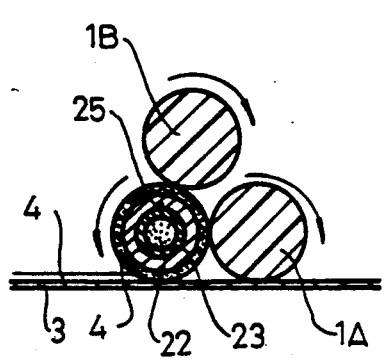
FIG. 7 is a cross-sectional view of line 7—7 in FIG. 6

The long roller 1A and the short roller 1B are provided with a plurality of longitudinal straight embossed lines on their surface, located only a little above the surface of the conveying belt 3 and in an inclined angle to the belt 3, but the inclined angle can be adjusted so that when the band dough sheet 4 laid on the belt 3 moves forward in the direction marked with an arrow head, the left corner of the beginning of the dough sheet 4 can first touch the long roller 1A turning in the clockwise direction, be picked and rolled up by the roller 1A and then be wound around the stuff transporting tube 2, which is positioned to have its cone-shaped end inclinedly point to the place where the end of the long roller 1A and the left corner of the beginning of the dough sheet 4 meet. The stuff transporting tube 2 rotates in the opposite—counterclockwise—direction, so the wound-up dough sheet 4 by the long roller 1A can be continuously moved and wound around the tube 2, which turns to wind the dough sheet 4 into a dough tube assisted by rotation of the short roller 1B and at the same time pushes out the stuff inside to fall out of its end opening into the dough tube. Thus a dough tube filled with stuff can be formed by forward movement of the belt 3, and with rotation of the two rollers 1A, 1B and the stuff transporting tube 2 at the same time, as shown in FIG. 7.

Figure 8:
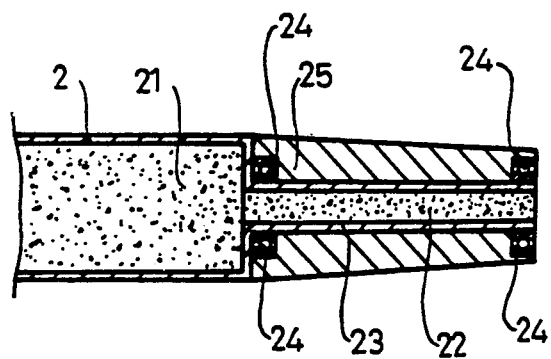
FIG. 8 is a magnified cross-sectional view of the part marked 8 in FIG. 6.
Figure 9:
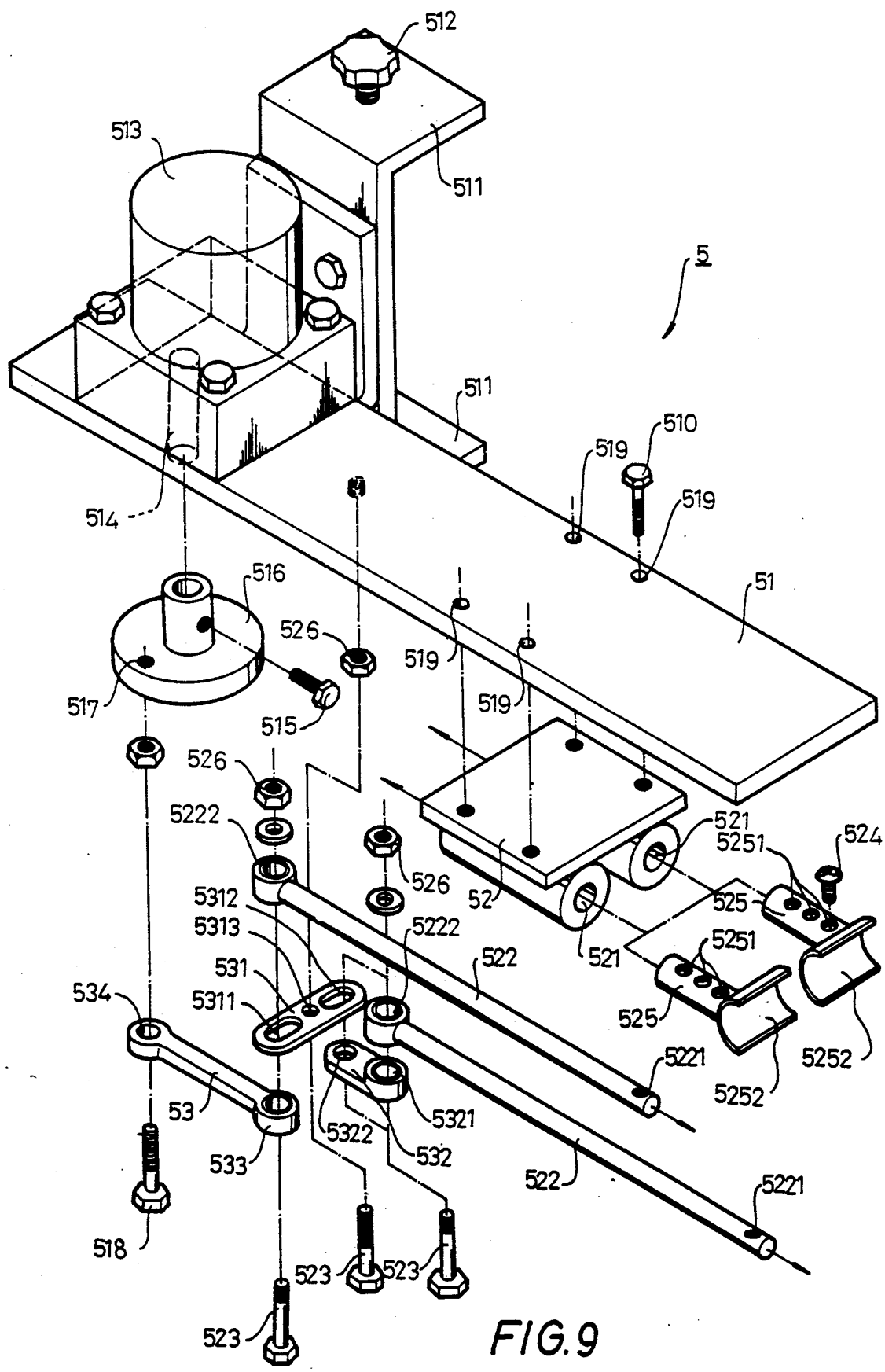
FIG. 9 is an exploded perspective view of a supplementary stuff filling device for a tubular stuffing apparatus in the present invention.

The stuff transporting tube 2, as shwon in FIG. 8, comprises an end portion 23 of a smaller diameter than the rest portion and an end opening 22 for stuff 21 contained in its interior to go out into the dough tube. The outer end and the inner end of the end portion 23 are provided with two bearings 24 and a tubular muzzle 25 is fitted around on the bearings 24 and the end portion 23 so that the muzzle 25 can rotate smoothly to facilitate the dough sheet 4 to be wound into a dough tube when the dough sheet 4 is rolled up by the long roller 1A and then wound around the stuff transporting tube 2.

A supplementary stuff filling device 5, as shown in FIGS. 9–12, is an additional component possible to be added to the first and the second embodiment of a tubular stuffing apparatus in the present invention, to force the stuff wrapped in the dough tube to be pressed tightly and solidly to leave as little air or space as possible in the interior of the dough tube. The supplementary stuff filling device 5 comprises a rectangular base 51 and a U-shaped clamp 511 to be fixed on a proper place on this apparatus by means of a bolt 512. A power source 513 such as a motor is to be placed on the base 51, having a shaft 514 connected with a transmitting wheel 516 with a bolt 515. The transmitting wheel 516 has an eccentric bolt hole 517 for a bolt 518 to connect an eccentric rod 53 with the transmitting wheel 516. The base 51 also has several bolt holes 519 for bolts 510 to combine a shaft base 52 with the base 51.

A shaft base 52 has two parallel shaft holes 521 for two long shafts 522 to fit and move therein. The two shafts 522 respectively have a bolt hole 5221 at one end for a bolt 524 to connect a pressing foot 525, which has some holes 5251 equally spaced apart for a bolt 524 to selectably fit in together in the hole 5221 so that the pressing foot can be adjusted in its length to extend from the end of each shaft 522. Each pressing foot 525 has a curved plate 5252 crosswisely fixed at the front end for pressing a dough tube formed by the stuff transporting tube 2. In order to conform with a variety of sizes of dough tubes, a variety of pressing feet 525 having a variety of curved plates 5252 with different size have to be prepared in advance.

The two long shafts 522 respectively have a bolt hole 5221 at one end and a connecting hole 5222 at the other end for a bolt 523 to pass through to screw with a nut 526, but one of the bolts 523 passes orderly through a hole 533 in an eccentric rod 53, an oval hole 5311 in an actuating plate 531, and the connecting hole 5222 in one of the shafts 522 and then screw with one of the nuts 526. Then the other of the bolts 523 passes orderly through a hole 5322 in a connecting plate 532, an oval hole 5312 in the actuating plate 531 and the connecting hole 5222 in the other of the shafts 522 and then screws with the other of the nuts 526.

The actuating plate 531 also has a central hole for another bolt 523 to pass through to screw with a bolt hole in the base 51 so as to position the actuating plate 531 to swing with the bolt 523 as a pivot so that the two long shafts 522 cna alternately move back and forth reciprocatingly guided by the two shaft holes in the shaft base 52.

The eccentric rod 53 has a hole 534 at one end for a bolt 518 to pass through to screw in a bolt hole 517 in the transmitting wheel 516 and a hole 533 at the other end for a bolt 523 to pass through to combine the eccentric rod 53 with the actuating plate 531 and one of the shafts 522.

Figure 10:
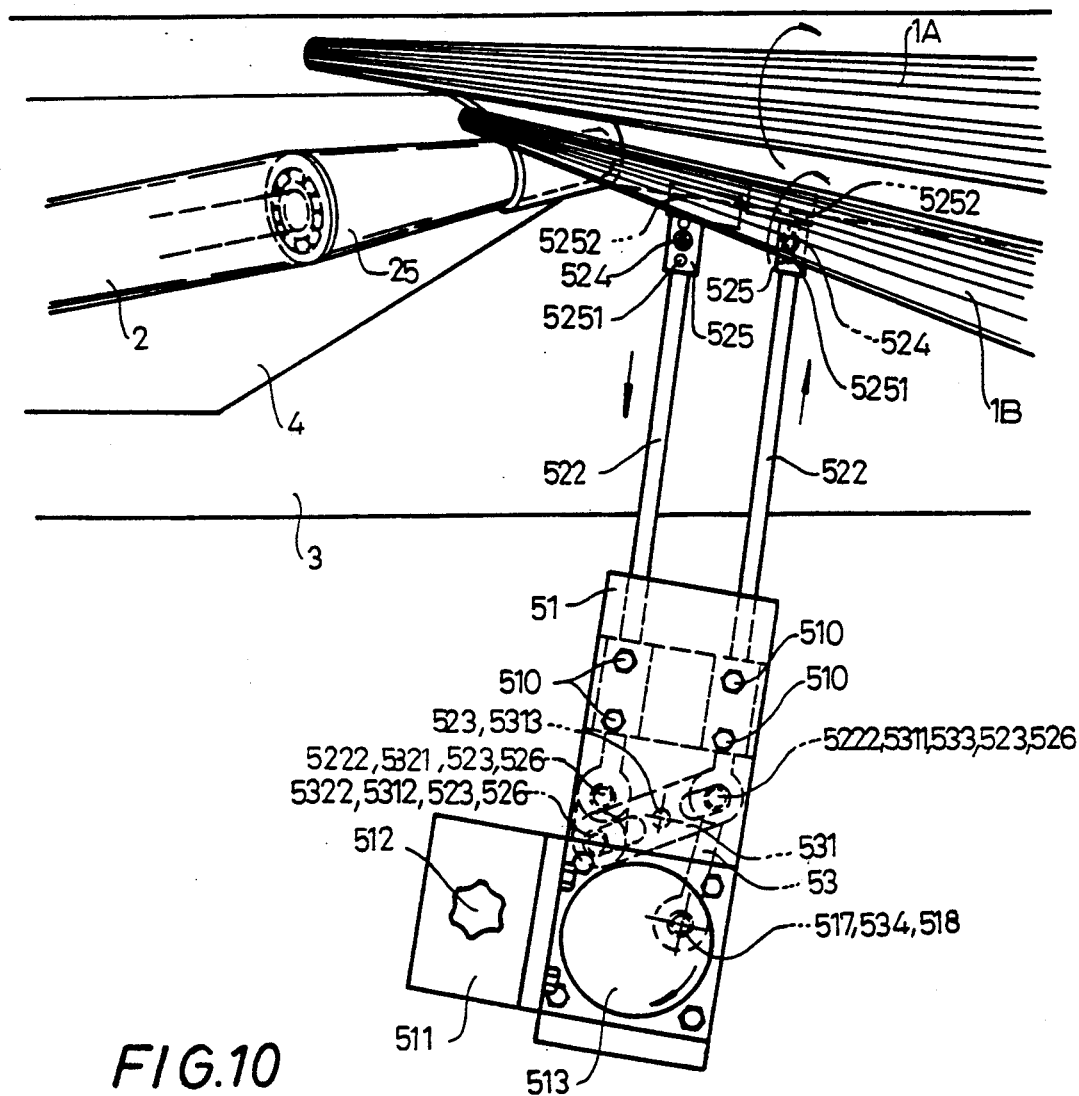
FIG. 10 is an upper view of a supplementary stuff filling device for a tubular stuffing apparatus in the present invention.
Figure 11:
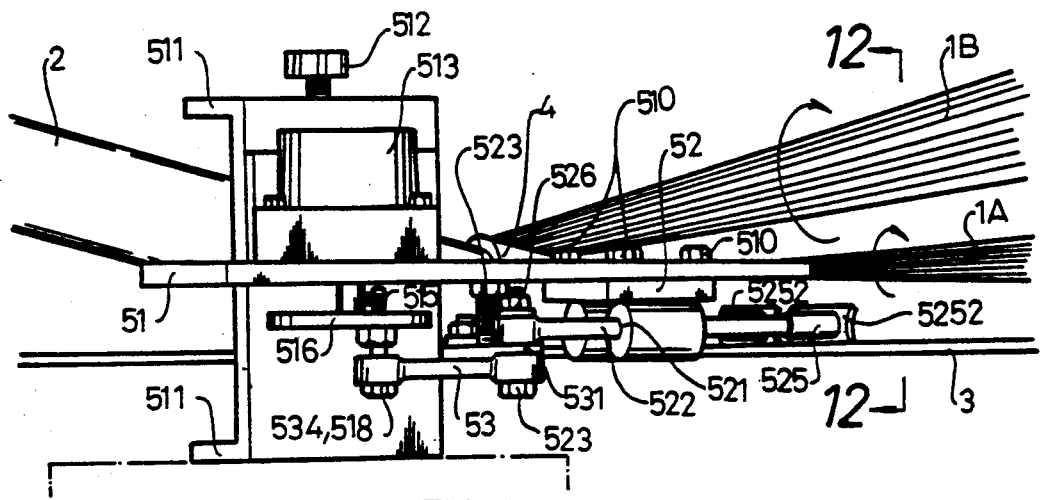
FIG. 11 is an elevational view of a supplementary stuff filling device for a tubular stuffing apparatus in the present invention.
Figure 12:
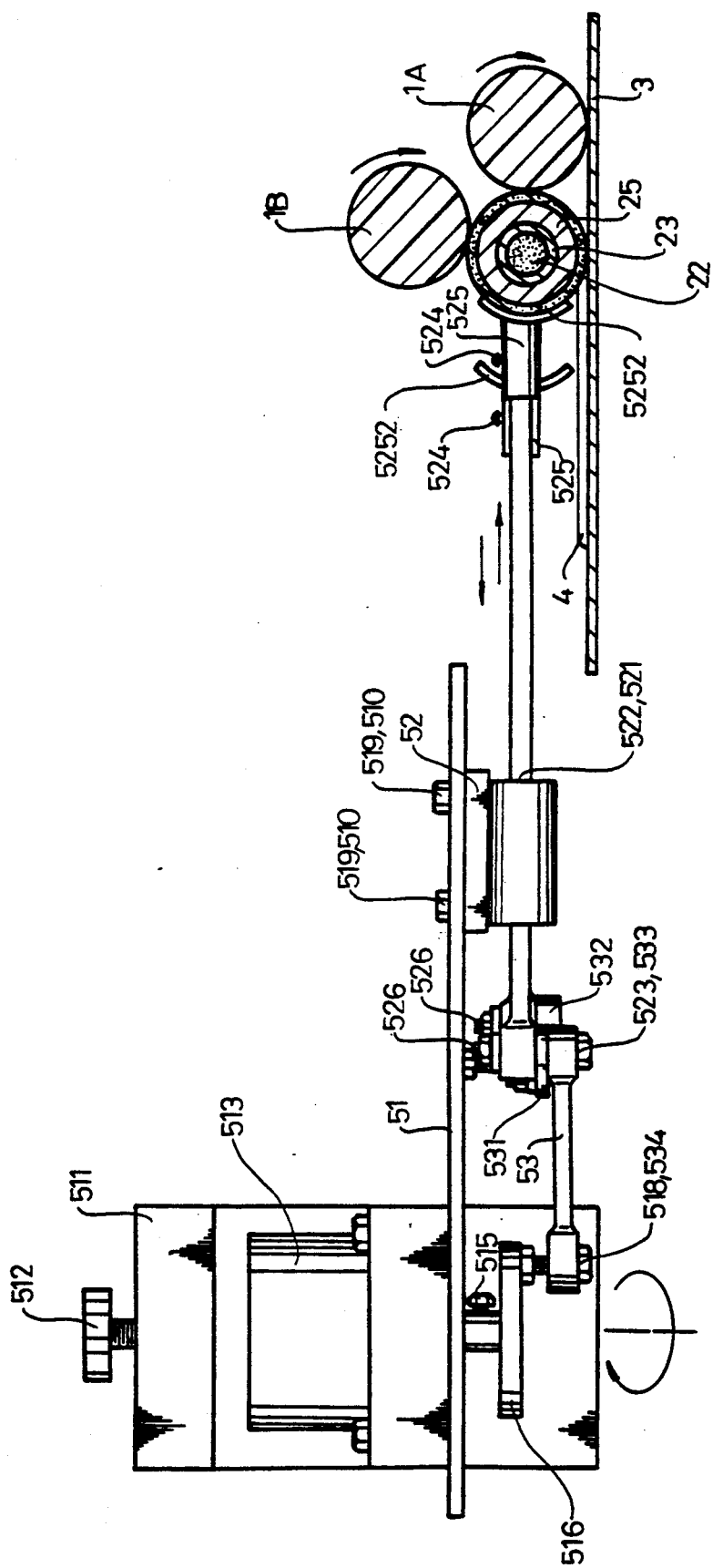
FIG. 12 is a cross-sectional view of line 12—12 in FIG. 11.

As FIGS. 10, 11, 12 show, the supplementary stuff filling device 5 is so positioned to have the pressing feet 525 at the ends of the two shafts 522 pointing to the dough tube wound by the stuff transporting tube 2 and the inner curved surface of the pressing feet able to closely press the outer surface of the dough tube by the alternate reciprocating movement of the two shafts 522 moved by the transmitting wheel 516, which is rotated by the power source, i.e. a motor. Then the stuff contained in the dough tube can be tightly and solidly pressed together with the dough tube.

What is claimed is:

1. A tubular stuffing apparatus comprising;
   a roller shaped conic, provided with a plurality of longitudinal straight embossed lines, positioned to be only a little above the surface of a conveying belt and to have its smaller end inclinedly pointing against the moving direction of the conveying belt which is moved by a power source, and picking and rolling up a corner of the beginning of a band dough sheet laid and moved forward on the conveying belt;
   a stuff transporting tube having stuff contained in its hollow interior and able to be transported forward to go out of an end opening of the tube, and positioned ot have its end opening to be located at the point where the corner of the begining of the dough sheet is picked up by the roller; and
   a conveying belt for a band dough sheet to lie on and be moved forward by a power source.

2. A tubular stuffing apparatus comprising;
   a long roller and a short roller both having a plurality of longitudinal straight embossed lines and rotating in the same direction, the long roller positioned to be only a little above the surface of of conveying belt and inclined to the belt so that the left corner of the begining of a band dough sheet can be picked and rolled up by the long roller when the band dough sheet laid on the belt is moved forward, and then laid on and wound around a stuff transporting tube rotating in the opposite direction to the long roller, the short roller positioned a little above the stuff transporting tube rotating to assist the stuff transporting tube to further wind the band dough sheet into a dough tube;
   a stuff transporting tube having its hollow interior for containing stuff to be transported out of its end opening to be wrapped in a dough tube formed by itself, a smaller-diameter end portion provided with two bearings and fitted around with a tubular muzzle able to freely rotate by means of the bearings so as to enable the dough sheet to be wound continuously around on the tube assisted by rotation of the short roller to be formed into a dough tube filled in with the stuff coming out of the stuff transporting tube; and
   a conveying belt for a band dough sheet to lie on and be moved forward by a power source.

* * * * *